United States Patent [19]
Lee et al.

[11] Patent Number: 6,089,852
[45] Date of Patent: Jul. 18, 2000

[54] MOLD CENTERING ARRANGEMENT FOR INJECTION MOLDING APPARATUS

[75] Inventors: Kyung-Tae Lee, Rexdale; Vincent Travaglini, Maple; Joseph Robert Klanfar, Rexdale, all of Canada

[73] Assignee: Tradesco Mold Limited, Rexdale, Canada

[21] Appl. No.: 09/064,108

[22] Filed: Apr. 22, 1998

[51] Int. Cl.$^7$ .................................................. B29C 45/66
[52] U.S. Cl. .................. 425/338; 425/450.1; 425/451.7; 425/588; 425/589
[58] Field of Search .............................. 425/338, 450.1, 425/451.7, 588, 589

[56] References Cited

U.S. PATENT DOCUMENTS

| | | | |
|---|---|---|---|
| 4,702,688 | 10/1987 | Schenk | 425/451.7 |
| 5,578,333 | 11/1996 | Schad et al. | 425/588 |
| 5,707,666 | 1/1998 | DiSimone et al. | 425/588 |

*Primary Examiner*—James P. Mackey
*Attorney, Agent, or Firm*—Gowling Strathy & Henderson

[57] ABSTRACT

A centering arrangement for controlling relative movement between a series of mold support plates in a stack mold having three or more levels. The centering arrangement uses a plurality of centering devices which are substantially identical, each spanning two mold levels and being connected to three adjacent mold support plates. Each centering device has a shaft generally parallel to an axis of the mold and having an intermediate portion journalled in an intermediate connector to allow rotational movement about a shaft axis, but to restrain relative axial movement between the shaft and the intermediate connector. Helical splines extend from the intermediate portion toward opposite ends of the shaft in oppositely twisting helices. End connectors having cooperating splines engage the splined portions of the shaft and connect the centering device to the outermost of the mold plates to which it is connected. The intermediate connector secures the centering device to the intermediate of the three mold plates to which the centering device is connected. Relative axial movement between the end connectors and the adjacent intermediate connector requires simultaneous translation and rotation of the shaft in equal amounts in both end connectors, thereby maintaining the intermediate connector centered between the two adjacent end connectors.

2 Claims, 4 Drawing Sheets

MOLD CENTERING ARRANGEMENT FOR INJECTION MOLDING APPARATUS

FIELD OF THE INVENTION

This invention relates to plastic injection molding apparatus and more particularly to mold centering arrangements for stack molds having three or more levels.

BACKGROUND OF THE INVENTION

A stack mold is an arrangement wherein two or more sets of molds are interspersed in sequence between a stationary platen and a movable platen of an injection molding machine. Each mold set comprises a core part and a cavity part, referred to as a "level", hence the term "four level" when four such mold sets are "stacked" between the machine platens.

The mold sets are moved between a closed molding arrangement wherein they are held together to an open or stripping arrangement wherein they are separated to enable removal or stripping of molded articles formed therebetween. The motive force for mold opening and closing is provided by the movable platen of the injection molding machine.

Reference is now made to FIG. 1A which schematically illustrates a typical prior art four level stack mold arrangement generally indicated by reference 10. The arrangement 10 includes first, second, third and fourth mold levels 12, 14, 16 and 18 respectively. Each of the mold levels 12, 14, 16 and 18 includes a cavity part 20 and a core part 22. The cavity parts 20 and core parts 22 are mounted on five sets of mold support plates which are identified in FIG. 1 as first, second, third, fourth and fifth mold support plates 24, 26, 28, 30 and 32 respectively. The first mold support plate is attached to a fixed platen 34 and the fifth mold support plate is secured to a movable platen 36. The expression "mold support plate" is used herein in a broad sense to include arrangements wherein the mold support plates are actually "sets" of plates rather than individual plates.

Only the fifth mold support plate 32 receives motive force from the movable platen 36. As all of the mold levels 12, 14, 16 and 18 need to be separated simultaneously by equal amounts, distribution apparatus is required to distribute movement of the movable platen 36 evenly to all four mold levels. One such apparatus is the prior art centering arrangement illustrated in FIG. 1 which comprises first, second and third centering devices 38, 40 and 42 respectively.

FIG. 1B is a partially cut away perspective view illustrating a typical centering device, generally identified by reference 50, of the type used for the first, second and third centering devices, 38, 40 and 42 respectively referred to above. As the centering devices have similar components, for the sake of simplicity, like reference numerals are applied to like components and the following general description applies to any of the centering devices referred to herein.

The centering device 50 has an intermediate connector 52 which would be rigidly secured to one of the second third or fourth mold support plates 26, 28 or 30 respectively. The centering device 50 further includes a shaft 54 which is journalled in the intermediate connector 52, the latter typically including a bearing, in such a manner that the shaft 54 is rotatable about a shaft axis 56 in the directions of arrows 58 but constrained against relative axial movement along the shaft axis 56. In other words, the shaft 54 can rotate in the intermediate connector 52, but cannot slide longitudinally through it.

The shaft 54 is provided with respective splines 60 and 62 extending from an intermediate portion 63 toward opposite ends of the shaft 54. The splines 60 and 62 are not parallel to the shaft axis 56, but are helically arranged about the shaft axis 56 with the helical arrangement of the splines 60 twisting opposite to the helical arrangement of the splines 62. The expression "splines" is being used herein to refer to a pattern of "grooves" extending along the surface of the shaft 54 rather than to a shaft having such a pattern. In other words, the shaft 54 would preferably be a single shaft with grooves twisting in opposite respective directions toward each end and not two grooved shafts connected end to end (which is not to say that the latter arrangement couldn't be made workable).

The splines 60 and 62 are received in corresponding splines in respective end connectors 64 and 66. The end connector 66 is shown partially cut away in FIG. 1B to illustrate splines 68. The end connectors 64 and 66 are rigidly secured to respective mold support plates, as discussed in more detail below.

In the arrangement illustrated in FIG. 1A, the second centering device 40 has its intermediate connector 52 secured to the third mold support plate 28 and one of its end connectors 64 and 66 secured respectively to each of the first mold support plate 24 and fifth mold support plate 32. Accordingly, as the moveable platen 36 is moved toward the right (away from the fixed platen 34) as illustrated in FIG. 1B, the shaft 54 will be caused, by the end connectors 64 and 66, to rotate and simultaneously "unthread" therefrom. The intermediate connector 52 permits the shaft 54 to rotate and allow the "unthreading" from the end connectors 64 and 66. As the intermediate connector 52 will not allow relative axial movement between the shaft 54 and the intermediate connector 52, the shaft 54 moves axially with the intermediate connector 52 along the shaft axis 56.

The helical splined arrangement prevents axial movement of either of the end connectors 64 and 66 without simultaneous rotation of the shaft 54 about the shaft axis 56. The shaft 54 however cannot rotate without simultaneous axial movement through the other of the end connectors 64 and 66. The pitch of the helical splines 60 and would typically be the same and accordingly, the end connectors 64 and 66 will move toward or away from the intermediate connector 52 in opposite but equal amounts in response to movement of the moveable platen 36. The rigid securement of the end connector 64, intermediate connector 52 and end connector 66 to the first, third and fifth mold support plates 24, 28 and 32 respectively will therefore maintain the third mold plate 28 equidistant from the first mold plate 24 and third mold plate 32 as the mold is opened and closed, hence the term "centering device".

In an analogous manner, the first centering device 38 has its intermediate connector 52 secured to the second mold support plate 26 and the end connectors 64 and 66 respectively secured to the first mold support plate 24 and third mold support plate 28. The third centering device 42 has its end connector 64, intermediate connector 52 and end connector 66 respectively secured to the third, fourth and fifth mold support plates 28, 30 and 32 respectively.

The first centering device 38 acts to center the second mold support plate 26 between the first and third mold support plates 24 and 28 respectively. The third centering device 42 acts to center the fourth mold support plate 30 between the third and the fifth mold support plates 28 and 32 respectively. The total effect of the first, second and third centering devices 38, 40 and 42 is to cause all four mold levels, 12, 14, 16 and 18 respectively to open and close simultaneously at generally the same rate and amount.

The first, second and third centering devices 38, 40 and 42 respectively, would typically be duplicated on the opposite side of the mold arrangement 10 to ensure even force distribution thereby avoiding cocking and subsequent jamming. Also, the first centering device 38 and third centering device 42 would typically be mounted behind the second centering device 40, horizontally in line with a mold axis 70. The second, third and fourth mold support plates 26, 28 and 30 respectively would typically be slidably supported on suitable guide rods, however this ancillary structure has not been illustrated to avoid cluttering the illustrations. Such support arrangements are well known to persons skilled in such molds.

Although the FIG. 1A arrangement provides satisfactory operation, it has two different lengths of shaft 54 and the maximum distance travelled and rate of travel between the intermediate connector 52 and the end connectors 64 and 66 is twice that for the second centering device 40 than it is for the first or third centering devices 38 and 42 respectively. Also, the prior art arrangement cannot be readily adapted for a different number of mold levels, such as a three level stack mold.

It is an object of the present invention to provide a centering arrangement for a stack mold having three or more levels which uses substantially identical centering devices to provide improved part interchangeability, to reduce the number of different parts required and to provide an arrangement wherein part wear is similar for each centering device. It is a further object of the present invention to provide a centering arrangement which can be replicated for stack molds having three or more levels.

SUMMARY OF THE INVENTION

A centering arrangement is provided for controlling relative movement between a series of mold support plates in a stack mold having first and last mold support plates attachable respectively to a fixed and a moveable platen of an injection molding machine and at least two intermediate mold support plates interspersed sequentially therebetween. The mold support plates are arranged along a common mold axis, with the last mold support plate being moveable toward and away from the first mold support plate along the mold axis by corresponding relative movement between the fixed and the moveable platens when the stack mold is attached to the injection molding machine.

The centering arrangement includes a respective centering device having an intermediate connector rigidly secured to each of the intermediate mold support plates and a respective end connector rigidly secured to each of the mold support plates on either side thereof.

Each centering device has a shaft generally parallel to the mold axis with splines extending from an intermediate portion of the shaft toward its opposite ends in oppositely twisting helices.

The intermediate portion of each shaft is journalled in its respective intermediate connector to allow rotational movement about a shaft axis while preventing relative axial movement between the shaft and the intermediate connector.

Each of the splines engages a complimentary spline in a respective of the end connectors.

In use, relative axial movement between one of the end connectors and its associated intermediate connector, caused by relative axial movement between the mold support plates to which they are respectively rigidly attached, causes the shaft to rotate and imparts a corresponding equal but opposite relative axial movement to the end connector engaging the opposite end of the shaft thereby maintaining each end connector and its associated mold support plate substantially equidistant from the intermediate connector therebetween and its associated mold support plate. Accordingly, the mold levels open and close simultaneously and in equal amounts.

DESCRIPTION OF THE DRAWINGS

A preferred embodiment of the present invention is described in detail below with reference to the accompanying drawings in which.

DESCRIPTION OF PREFERRED EMBODIMENT

Figure 1A:
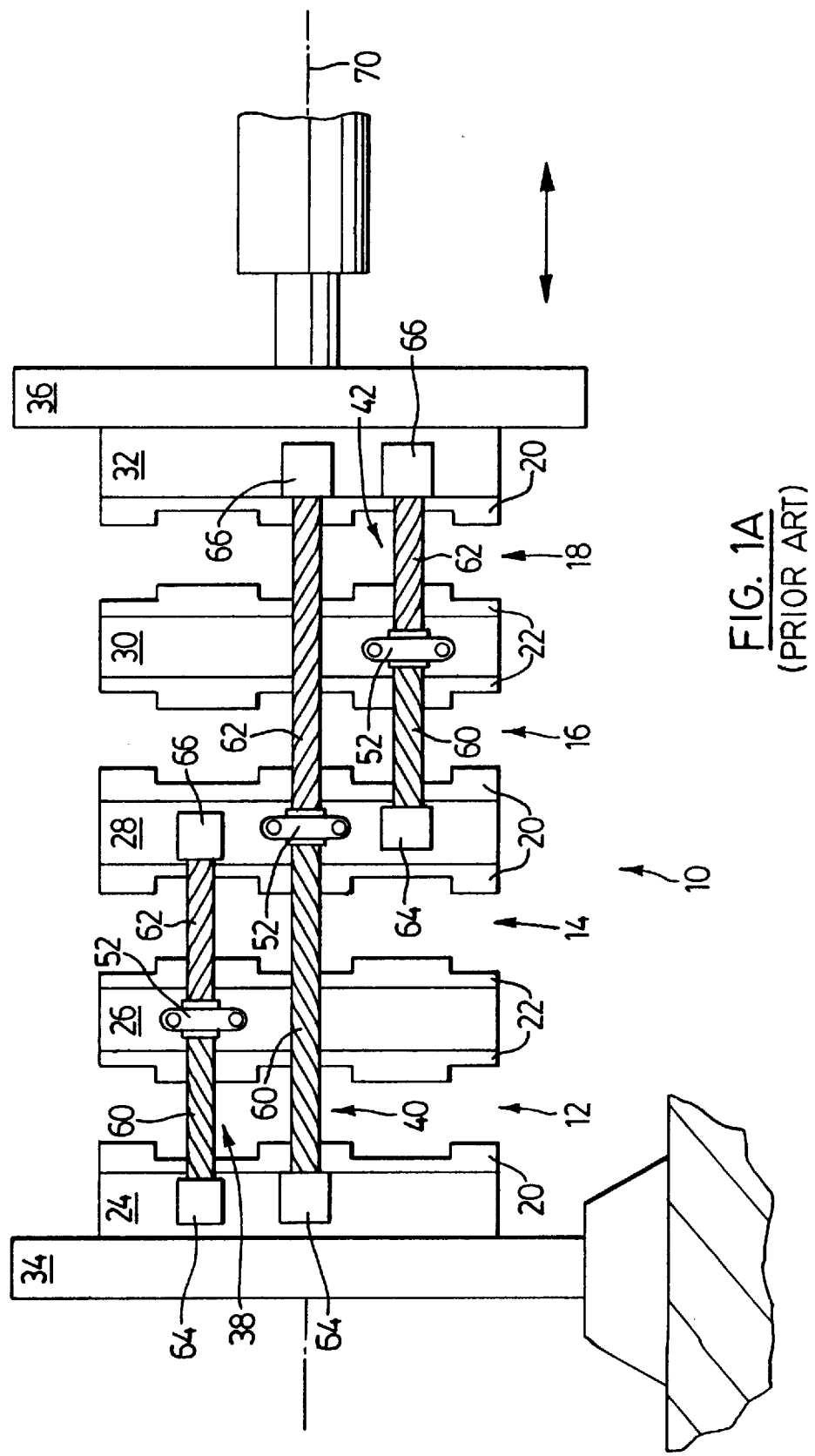
FIG. 1A is a schematic illustration of a prior art centering arrangement.
Figure 2:
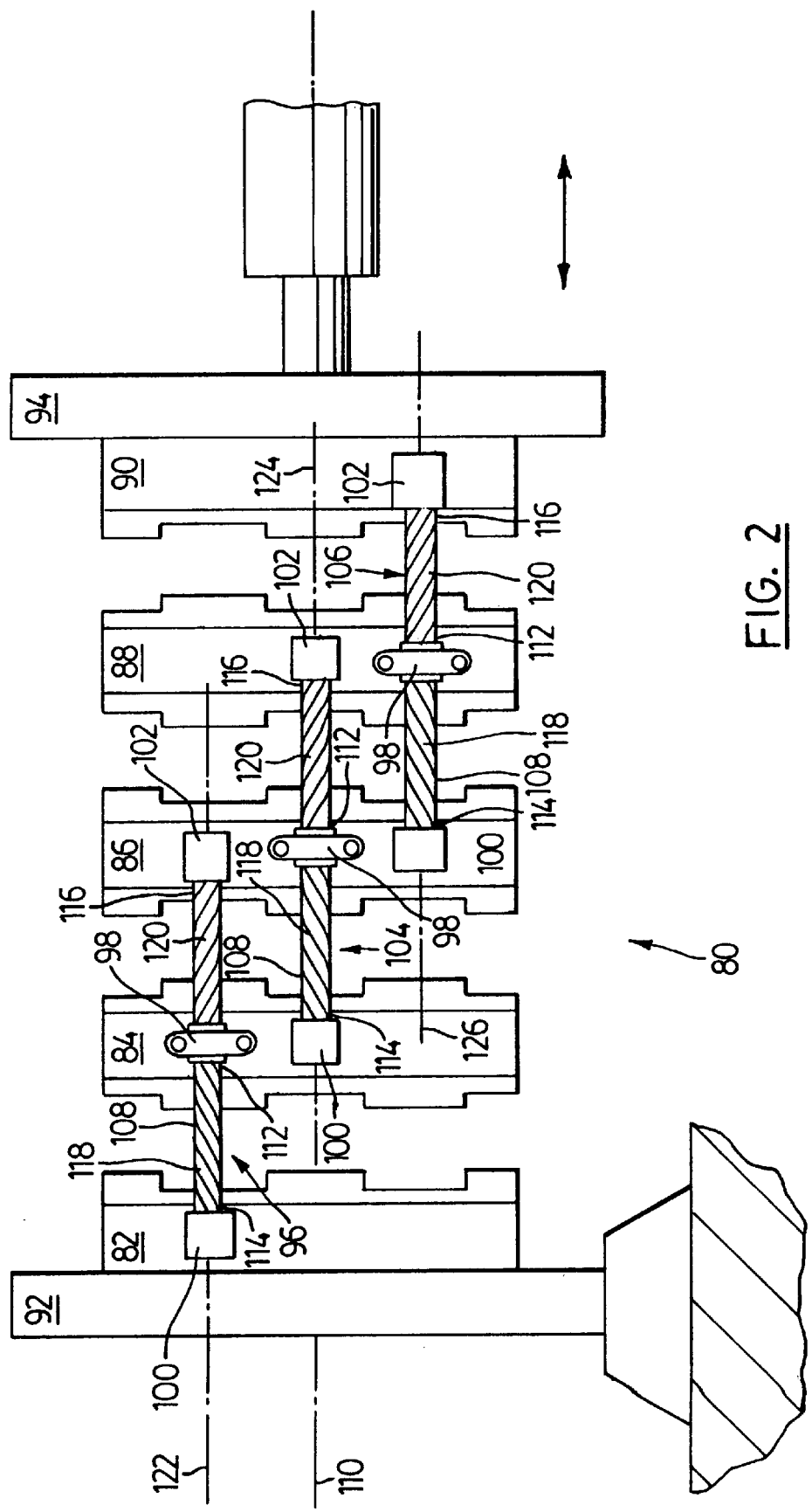
FIG. 2 is a schematic illustration of a centering arrangement according to the present invention mounted to a four level stack mold.

A centering arrangement according to the present invention is generally indicated by reference 80 in FIG. 2. The centering arrangement is shown mounted to a four level stack mold arrangement having first, second, third, fourth and fifth mold support plates 82, 84, 86, 88 and 90 respectively. The first mold support plate 82 is secured to a fixed platen 92 the fifth mold support plate 90 is secured to a moveable platen 94. The fifth mold support plate 90 may also be referred to as a "last" mold support plate. The second, third and fourth mold support plates 84, 86 and 88 may be referred to as "intermediate" mold support plates. The four level stack mold arrangement is similar to that described in detail above with respect to FIG. 1A and therefore is not re-described here to avoid repetition.

Figure 1B:
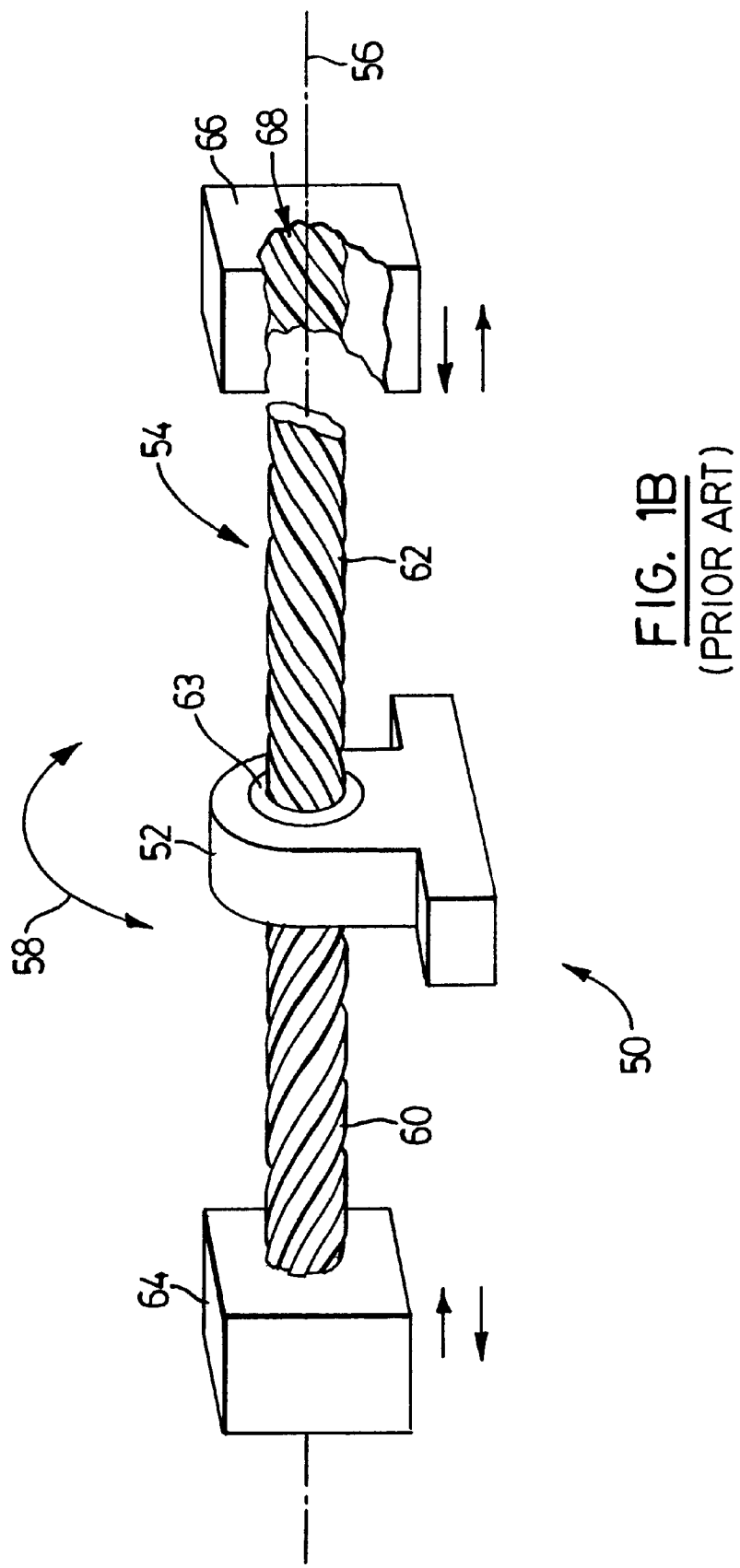
FIG. 1B is a perspective view, partially cut away of a prior art centering device.

The relative movement between the mold support plates 82, 84, 86, 88 and 90 is accomplished by a novel centering arrangement having three centering devices of the type illustrated generally by reference 50 in FIG. 1B. A first centering device 96 has an intermediate connector 98 rigidly secured to the second mold support plate 84 and respective end connectors 100 and 102 rigidly secured to the first mold support plate 82 and second mold support plate 84.

A second centering device 104 has an intermediate connector 98 rigidly secured to the third mold support plate 86 and respective end connectors 100 and 102 rigidly secured to the second mold support plate 84 and third mold support plate 88.

A third centering device 106 has an intermediate connector 98 rigidly secured to the fourth mold support plate 88 and respective end connectors 100 and 102 rigidly secured to the third mold support plate 86 and fifth mold support plate 90.

Each centering device 96, 104 and 106 has a shaft 108 generally parallel to a mold axis 110. The shafts 108 have splines 118 and 120 extending therealong, outwardly from an intermediate portion 112 toward opposite ends 114 and 116 in respectively oppositely twisting helices. The shafts 108 are substantially the same for all of the first, second and third centering devices 96, 104 and 106 respectively.

The intermediate portions 112 are journalled in the intermediate connectors 98 to permit rotational movement about respective shaft axes 122, 124 and 126 of the first, second and third centering devices 96, 104 and 106 respectively, while preventing relative axial movement between each shaft 108 and its intermediate connector 98.

Each of the splines 118 and 120 engages a complimentary spline in a respective of the end connectors 100 and 102. A typical spline is illustrated in FIG. 1B at reference 68. Relative axial movement between one of the end connectors 100 and 102 and the intermediate connector 98 caused by relative axial movement between associated of the mold support plates 82, 84, 86, 88 and 90 respectively causes a rotational movement of the shafts 108 about their respective shaft axes 122, 124 and 126. The rotation imparts a corresponding equal but opposite relative axial movement to the end connector 100 or 102 engaging the opposite end 114 or 116 respectively of the shaft 108. Each of the end connectors 100 and its associated end support plate 82, 84, or 86 respectively, is thereby maintained substantially the same distance from the respective intermediate connector 98, and its associated mold plate 84, 86 or 88 respectively as each of the corresponding end connectors 102 and its associated mold support plate 86, 88 or 90 respectively.

As can be seen in FIG. 2, each of the first, second and third centering devices, 96, 104 and 106 respectively, spans three mold support plates. Accordingly, the first, second and third centering devices, 96, 104 and 106 respectively, can be substantially identical thereby providing ready part interchangeability. Also, as the distances travelled along the shafts 108 by the end connectors 100 and 102 is substantially the same for the first, second and third centering devices, 96, 104 and 106 respectively, wear and torsional loading will be substantially the same.

As each of the centering devices 96, 104 and 106 are substantially identical and span three adjacent mold support plates, the above arrangement is not restricted to four level stack molds, unlike the prior art arrangement. The arrangement lends itself to any stack mold arrangement having first, last, and at least two intermediate mold support plates. For example, FIG. 3 illustrates a centering arrangement according to the present invention in association with a three level stack mold generally indicated by reference 198.

Figure 3:
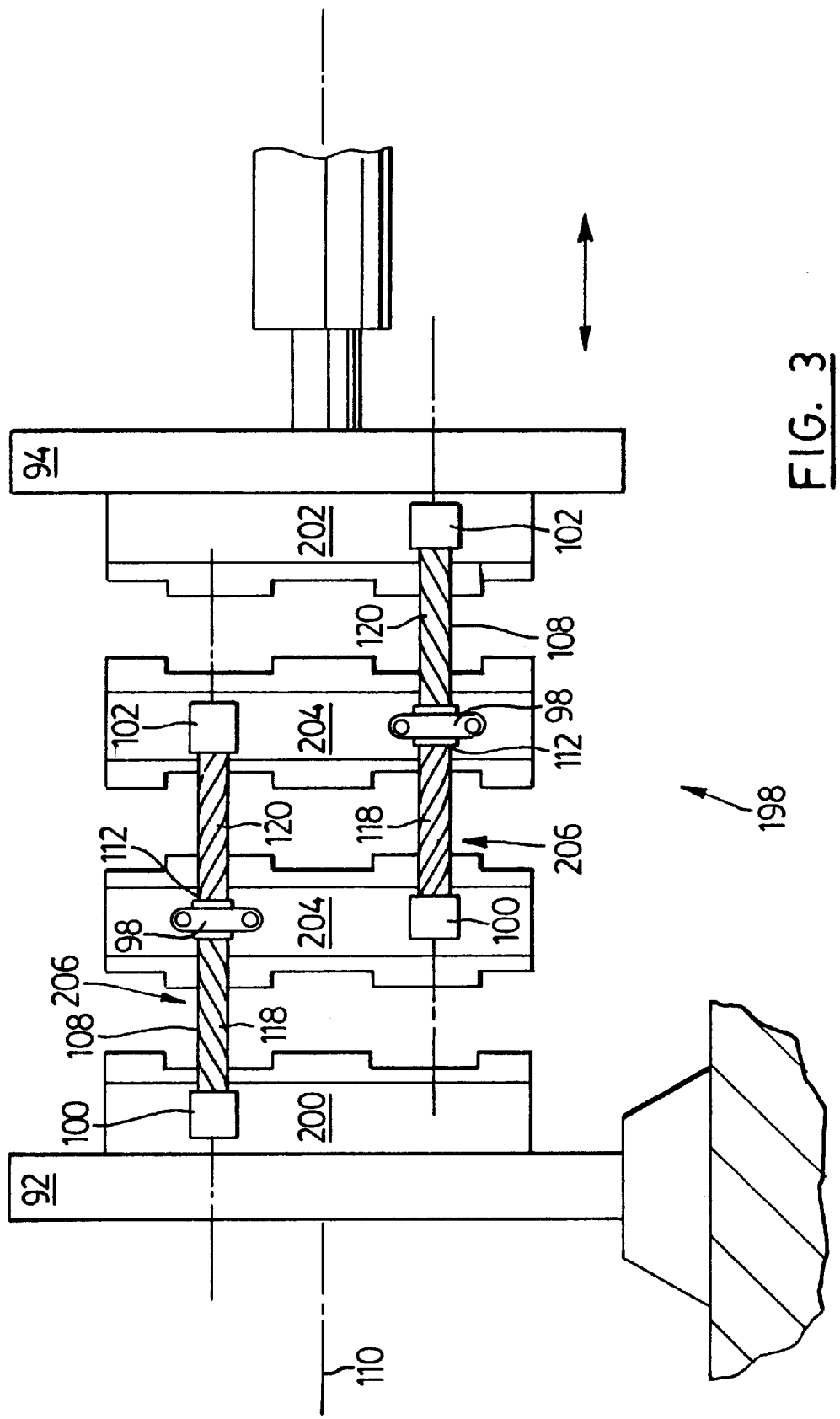
FIG. 3 is a schematic illustration of a centering arrangement according to the present invention mounted to a three level stack mold.

In the FIG. 3 arrangement, a first mold support plate 200 is secured to the fixed platen 92 and a last mold support plate 202 is secured to the moveable platen 94. Two intermediate mold support plates, each labelled 204, are sequentially interspersed between the first mold support plate 200 and the last mold support plate 202. Respective centering devices generally indicated by reference 206 have their intermediate connectors 98 rigidly secured to each of the intermediate mold support plates 204. A respective end connector 100, or 102, is rigidly secured to each of the mold support plates on either side thereof. In other words, the uppermost of the centering devices 206 has its intermediate connector 98 secured to the leftmost intermediate mold plate with an end connector 100 secured to the first mold support plate 100 and an end connector 102 secured to the rightmost intermediate mold support plate 204. Similarly, the lowermost centering of the devices 206 has its intermediate connector 98 connected to the rightmost intermediate mold support plate 204 with an end connector 100 connected to the intermediate mold support plate 204 immediately to its left and an end connector 102 connected to the last mold support plate 202 immediately to its right.

The above interpretation is intended in an illustrative rather than a restrictive sense. Variations to the exact arrangements described may be apparent to those skilled in such devices. Any such variations are to be included in the scope of this patent if such variations fall within the spirit and scope of the claims set out below.

We claim:

1. A centering arrangement for controlling relative movement between a series of mold support plates in a multi-level stack mold with at least three mold levels having first and last mold support plates attachable respectively to a fixed and a moveable platen of an injection molding machine and at least two intermediate mold support plates interspersed sequentially therebetween along a common mold axis, said last mold support plate being moveable relative to said first mold support plate along said mold axis by corresponding relative movement between said fixed and moveable platens when said stack mold is attached to said injection molding machine, said centering arrangement comprising:

a respective centering device having an intermediate connector rigidly secured to each of said intermediate mold support plates and a respective end connector rigidly secured to each of said mold support plates on either side thereof and immediately adjacent thereto;

each said centering device having a shaft generally parallel to said mold axis with splines extending from an intermediate portion toward opposite ends thereof in oppositely twisting helices;

each said intermediate portion being journalled in a respective of said intermediate connectors to allow rotational movement about a shaft axis while preventing relative axial movement between said shaft and said respective intermediate connectors;

each of said splines engaging a complimentary spline in a respective of said end connectors;

whereby relative axial movement between one of said end connectors and an associated of said intermediate connectors caused by relative axial movement between associated of said mold support plates causes said shaft which it engages to rotate and imparts a corresponding equal but opposite relative axial movement to the end connector engaging the opposite end of said shaft thereby maintaining each said end connector and its associated mold support plate substantially equidistant from the intermediate connector therebetween and its associated mold support plate.

2. A centering arrangement for controlling relative movement between a series of mold support plates in a four level stack mold having first and fifth mold support plates attachable respectively to a fixed and a moveable platen of an injection molding machine and second, third and fourth mold support plates interspersed sequentially therebetween with said mold support plates being arranged along a common mold axis, and said fifth mold support plate being moveable toward and away from said first mold support plate along said mold axis by corresponding relative movement between said fixed and said moveable platens when said stack mold is attached to said injection molding machine, said centering arrangement comprising;

a first centering device having an intermediate connector rigidly secured to said second mold support plate and a respective end connector rigidly secured to each of said first and said third mold support plates;

a second centering device having an intermediate connector rigidly secured to said third mold support plate and a respective end connector rigidly secured to each of said second and said fourth mold support plates; and, a third centering device having an intermediate connector rigidly secured to said fourth mold support plate and a respective end connector rigidly secured to each of said third and said fifth mold support plates;

each said centering device having a shaft generally parallel to said mold axis with splines extending from an intermediate portion toward opposite ends thereof in oppositely twisting helices;

each said intermediate portion being journalled in a respective of said intermediate connectors to allow rotational movement about a shaft axis while preventing relative axial movement between said shaft and said respective intermediate connector;

each of said splines engaging a complimentary spline in a respective of said end connectors;

whereby relative axial movement between one of said end connectors and an associated of said intermediate connectors caused by relative axial movement between associated of said mold support plates causes said shaft which it engages to rotate and imparts a corresponding equal but opposite relative axial movement to the end connector engaging the opposite end of said shaft thereby maintaining each said end connector and its associated mold support plate substantially equidistant from the intermediate connector therebetween and its associated mold support plate.

* * * * *